United States Patent [19]

Macko et al.

[11] Patent Number: 4,520,677
[45] Date of Patent: Jun. 4, 1985

[54] SOLIDS MASS FLOW INDICATION WITH RADIATION

[75] Inventors: Joseph E. Macko; Isnard Estriplet, both of Irwin, Pa.

[73] Assignee: The United States of America as represented by the United States Department of Energy, Washington, D.C.

[21] Appl. No.: 316,697

[22] Filed: Oct. 30, 1981

[51] Int. Cl.³ .............................................. G01F 1/86
[52] U.S. Cl. ........................................ 73/861; 73/217; 73/218; 73/861.03; 250/356.1; 250/434; 250/435
[58] Field of Search ............ 73/218, 217, 861, 861.01, 73/861.02, 861.03; 250/356.1, 356.2, 434, 435

[56] References Cited

U.S. PATENT DOCUMENTS

| 2,195,322 | 3/1940 | Supplee et al. | 250/434 |
| 2,953,681 | 9/1960 | Frazier | 250/356.1 |
| 3,130,304 | 4/1964 | Johnston | 250/356.2 X |
| 4,149,411 | 2/1977 | Fisher et al. | 73/218 X |
| 4,238,956 | 12/1980 | Sniezek et al. | 73/861.01 |
| 4,282,433 | 4/1979 | Löffel | 250/356.1 |

FOREIGN PATENT DOCUMENTS

| 125413 | 9/1980 | Japan | 73/861 |
| 317149 | 2/1932 | United Kingdom | 73/217 |
| 186729 | 3/1966 | U.S.S.R. | 73/861.02 |

OTHER PUBLICATIONS

A Study of the State of the Art of Instrumentation for Process Control and Safety in Large Scale Coal Gasification & Fluidized Bed Combustion Systems (Final Report), 1–1976, O'Fallon et al.
Review of Instrumentation Needs for Process Control and Safety in Advanced Fossil Energy Processes (Draft Report), 12–1980, O'Fallon et al.
Overview of Instrumentation Needs for Advanced Fossil Energy Processes, O'Fallon, 1–1982, Argonne National Laboratory.
The Proceedings of the 1982 Symposium on Instrumentation and Control of Fossil Energy Processes, Argonne National Laboratory, 6–1982.

Primary Examiner—S. Clement Swisher
Assistant Examiner—Tom Noland
Attorney, Agent, or Firm—W. E. Otto

[57] ABSTRACT

Method and apparatus for indicating mass flow of a solid particulate material through a rotary feeder. A radiation source and detector are positioned in a manner whereby radiation flux is directed through, and attenuated by, particulate material contained in rotating pockets. A Cesium-137 gamma source can be mounted within the shaft of the feeder, and one or more detectors can be mounted outside of the feeder housing. The detected signal is indicative of the mass of particulate material contained within a given pocket rotating within the feeder.

3 Claims, 5 Drawing Figures

SOLIDS MASS FLOW INDICATION WITH RADIATION

GOVERNMENT CONTRACT

The United States Government has rights in the invention described herein pursuant to Contract No. DE-AC-0180-ET-14752 between the U.S. Department of Energy and Westinghouse Electric Corporation.

BACKGROUND OF THE INVENTION

1. Field of the Invention

This invention relates to a system for indicating the mass flow of solids, and particularly provides a system for indicating particulate coal or coal derivative mass flow through a rotating feeder.

2. Description of the Prior Art

In many systems transporting solids or particulate matter, it is important to continuously or intermittently monitor mass flow in order to properly maintain the process control. This is particularly required in the process streams of coal gasification, liquification, and fluidized bed combustion systems. Such systems typically feed coal, or coal derivatives such as char, in particulate form, from lock hoppers through star wheel feeders and, in a transport gas, to the process reactor.

While the mass flow rate of the transport gas, prior to mixing with the particulate matter can be accurately identified with devices such as an orifice, identification of the particulate matter mass flow rate prior and subsequent to mixing with the transport gas, cannot be easily measured with sufficient accuracy. A primary reason for this limitation is that in-line devices, at the operational flow rates, are subjected to a sandblasting type effect which substantially shortens operational life. Additionally, the particulate matter tends to travel at a different flow rate than the transport gas.

Techniques presently used to determine particulate mass flow, upstream of the area of mixing with the transport gas, include lock hopper weight measurement, star wheel feeder rotational speed measurement, and a technique utilizing filtering of lock hopper weight measurement data. Each of these techniques, however, present some undesirable characteristics. Lock hopper weight measurements typically utilize a plurality of strain gauge type load cells which are summed and monitored. These systems are complicated by mechanical restraints, imposed by rigid process system piping and stresses placed upon the hopper by pressurization and thermal expansion, imposing extraneous stresses on the gauges. Designs can be provided which guarantee a free floating lock hopper and load cell system, and which provide accurate indications, but only with substantial complexity.

With utilization of a star wheel feeder, although the volume of the feeder pockets is known, the pockets are not uniformly filled. Particle size, moisture content and other variables affect the mass transfer rate for a given revolution rate. Additionally, fine material tends to be retained for a period of time within the feeder pockets and the surrounding casing as a result of pressure differentials, thus providing inaccurate mass flow indications.

More recently proposed are systems for measuring flow of particulate coal mixed with a transport gas which utilized temperature measurements and a heat balance. While such systems represent an improvement in the art, additional improvements can be made. For example, such measurements are limited to flow of solid material in a transport gas, and require input from multiple thermal monitors.

It is therefore desirable to provide substantially on-line systems for determining particulate mass flow rate which alleviate the discussed limitations. It is further desirable to provide systems which are simple, reliable and which take advantage of existing technology and components.

SUMMARY OF THE INVENTION

This invention provides method and apparatus for indicating mass flow of solid particulate material through a rotary feeder. It is readily adaptable to conventional feeders of the type typically referred to as star wheel feeders. Such feeders include a plurality of vanes extending radially from a rotating shaft, mounted within a housing, to form a plurality of rotating pockets which receive, transmit through the housing, and subsequently discharge, solids.

In preferred form, a gamma radiation source is mounted within the rotating shaft and one or more gamma detectors are positioned externally of the housing. In this manner the radiation flux emitted from the source passes through each pocket during its revolution, and to the detector. The gamma flux is attenuated during passage through the pocket to a degree which is a function of the mass of solid material contained within the pocket. By appropriately calibrating the output of the detector, mass flow through the feeder is indicated.

Plural detectors are preferably utilized, including one which is positioned to detect flux passing through a pocket which is in a filled position, and another which is positioned to detect flux through a pocket which has discharged the particulate material and is about to be filled. The difference among the mass determinations from a given pocket in each of these positions provides an indication of the amount of solids carryover in the pocket, and accordingly a more accurate determination of actual mass flow can be obtained.

BRIEF DESCRIPTION OF THE DRAWINGS

The advantages, nature and additional features of the invention will become more apparent from the following description, taken in connection with the accompanying drawings, in which.

DESCRIPTION OF THE PREFERRED EMBODIMENTS

Figure 3:
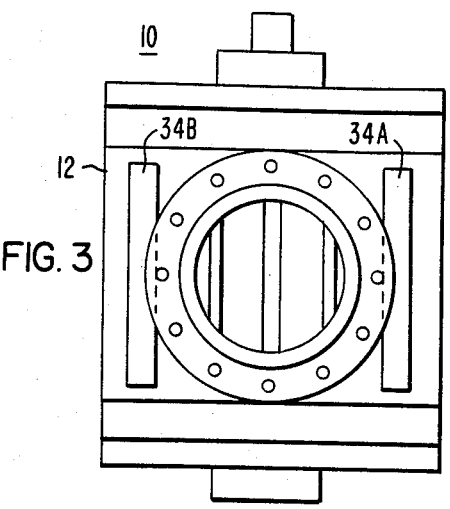
FIG. 3 is a top view of the feeder of FIG. 1.
Figure 2:
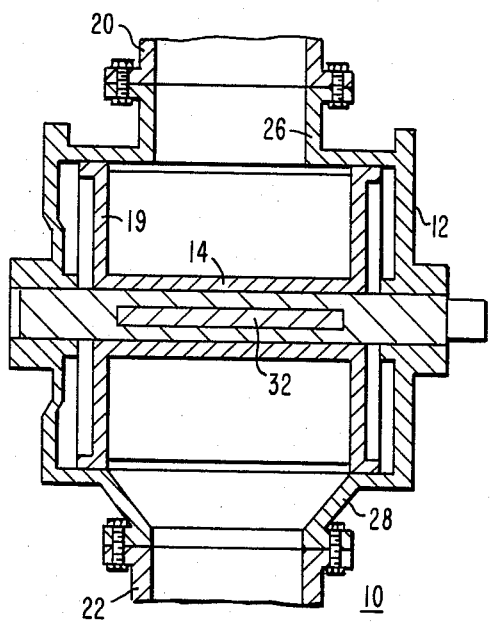
FIG. 2 is a front elevation view, in section, of the feeder of FIG. 1.
Figure 1:
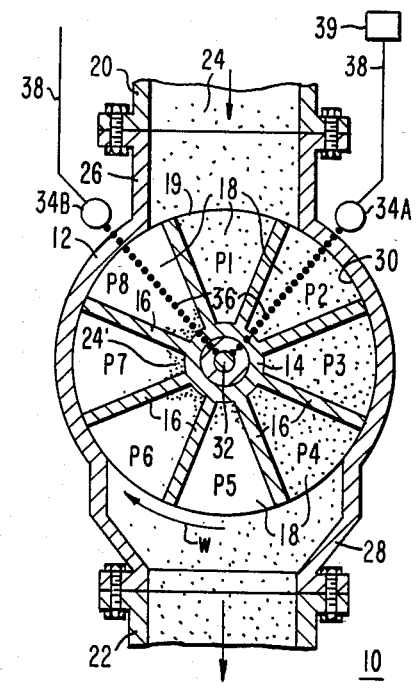
FIG. 1 is a side elevation view, in section, of a rotary feeder in accordance with the invention.

Referring now to FIGS. 1 through 3, there is shown an exemplary rotary feeder 10 in accordance with the invention. The feeder 10 includes a housing 12 within which is mounted a rotatable shaft 14. Radially extending from the shaft are a plurality of vanes 16 which form within the housing a plurality of pockets 18. The pockets are bounded laterally by side walls 19. Upon rotation of the shaft 14, the vanes 16 and pockets 18 accordingly rotate.

The housing is generally affixed to an inlet conduit 20 and an outlet conduit 22 through which flow a solid particulate material 24 such as pulverized coal. The particulate material 24 may be free flowing, and can also be carried in a selected transport gas. The material 24 enters the feeder 10 through an inlet 26, and is discharged through an outlet 28.

With a clockwise rotational velocity ω as shown in FIG. 1, particulate material enters and substantially fills the pockets 18 at the position identified as P1, is carried through positions P2, P3, P4, and is discharged at position P5. At positions such as P2 and P3, the pocket 18 is substantially filled, and its volume is readily defined between the shaft 14, the interior surface 30 of the housing 12, and the side walls 19. A certain amount of particulate material 24' often adheres within the pocket. Subsequent to discharge of the bulk of the material within the pocket, the substantially empty pocket 18 continues rotation through positions P6, P7 and P8 and returns to position P1 to be refilled.

Positioned within the shaft 14 are means for discharging a radiation flux, such as a gamma source 32. The source 32 can, for example, comprise Cesium-137. Positioned beyond the volume of the pocket 18 and preferably external of the housing 12, are one or more means for detecting and signalling radiation flux, such as the gamma detectors 34A and 34B. The detectors 34 can also be mounted within the walls of the housing 12. Additionally, a detector can be mounted within the shaft 14, and a source mounted beyond the pockets 18. The latter configuration, however, may require more complex radiation shielding.

As the flux passes from the source 32 to the detectors 34, indicated by the dotted line 36, it is attenuated by any material in its path. Thus, initial calibrations can relate a given detection, and a corresponding signal output, to the amount of solids material in the pocket. The detectors 34 preferably extend the length of the pockets, as shown in FIG. 3, and will yield a result indicative of the average mass of solids material in each pocket.

Figure 4:
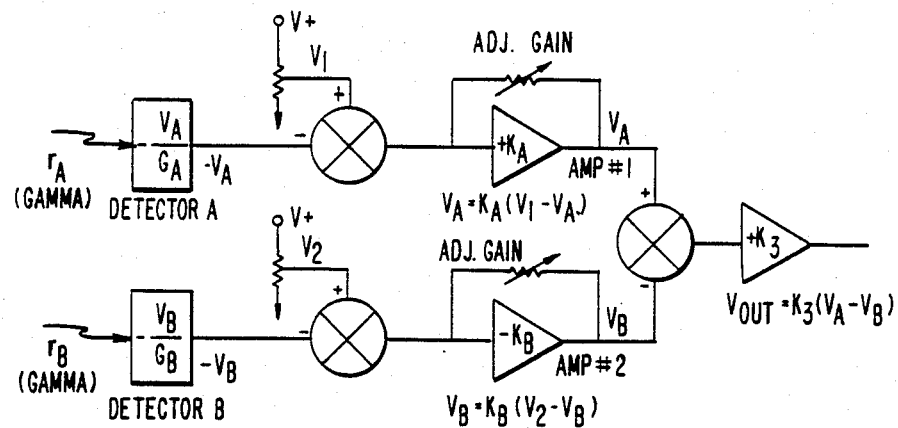
FIG. 4 is a simplified circuit diagram of an amplification circuit.

A signal from the detectors 34, through connectors 38, can be operated upon in a conventional manner by a monitoring device 39 to provide a relative or absolute indication of mass flow. For example, a simplified amplification circuit is shown in FIG. 4.

The signals at the detector $\gamma$ are inversely proportional to the outputs $V_A$, $V_B$. The outputs are biased ($+V$, $V_1$, $V_2$) then zeroed. Via an adjustable gain amplifier K for each output the two signals ($V_A$, $V_B$) are then summed to give a final output $V_{out} = K_3 (V_A - V_B)$.

Figure 5:
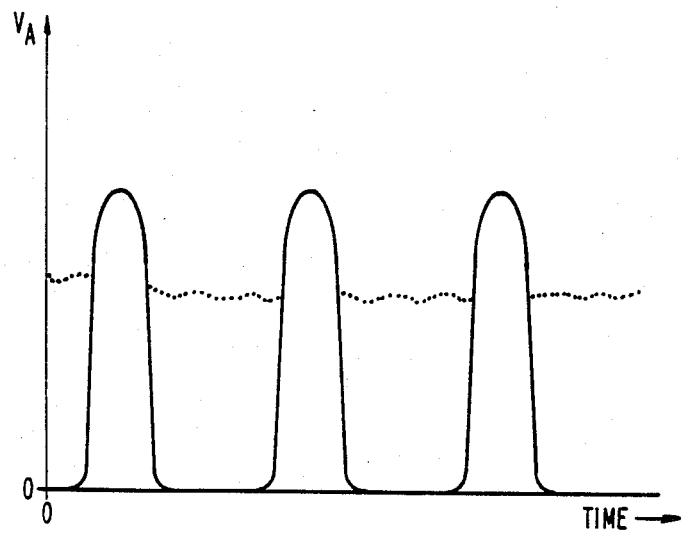
FIG. 5 is a theoretical graph of amplified voltage associated with a given detector signal output ($V_A$) versus time (t).

A theoretical voltage signal from the amplifier $K_A$, corresponding to the detector 34A on the "filled" side of the feeder, upon rotation of an empty feeder 10, is shown as the solid line in FIG. 5. The peaks are representative of the flux and signal attenuation caused by the vanes 16, and the time period between peaks is a function of the shaft rotational velocity ω. The zero signal between peaks, adjusted to a zero position through initial calibration, is representative of pockets containing no solids material. With pockets being substantially filled during rotation, the voltage signal, $V_A$, between the peaks of the vanes, is shown by the dashed line of FIG. 5. This signal is indicative of the quantity of solids material in each rotating pocket.

The detector 34b and amplifier $K_B$ can similarly be integrated to yield the quantity of solids material retained within the pockets which are rotating to be filled.

The difference between the determined mass contained in a given pocket in its full and empty positions can be utilized to provide a more accurate indication of mass flow through the feeder 10. This determination should take into account the amount of material in the pocket prior to filling, as well as the amount of material left in the pocket subsequent to discharge of most of the contained solids material.

The circuit in FIG. 4 is based on the fact that Pocket B has less material in it than Pocket A. An alternate method, employing a timing circuit, could be included to compare Pocket A before filling and with Pocket A after filling.

Since numerous changes may be made in the above-described system without departing from the spirit and scope of the disclosure, it is intended that the description be received as illustrative, and not in a limiting sense.

We claim:

1. An improved rotary feeder system for transporting solid particulate material of the type having a rotary feeder including a plurality of vanes extending radially from a rotating shaft so as to form pockets rotatable within a housing between a housing inlet where said solid material is received by said pockets and a housing outlet where said solid material is discharged from said pockets, said improvement comprising:
    a flux discharging radiation source disposed within said shaft;
    a first radiation detector disposed externally of said rotatable pockets downstream of said inlet and upstream of said outlet;
    a second radiation detector disposed externally of said rotatable pockets downstream of said outlet and upstream of said inlet;
    means for measuring the amount of flux transmitted through said pockets to said first and second detectors, said means providing signals indicative of mass content within said rotatable pockets; and
    means for correlating said signals to provide an indication of mass flow through said pockets.

2. An improved rotary feeder for transporting said particulate material of the type having a plurality of vanes extending radially from a rotatable shaft so as to form rotatable pockets within a housing, said improvement comprising:
    a radiation source disposed within said shaft; and
    a radiation detector disposed beyond said pocket such that the radiation flux emitted from said source passes from said shaft through said rotating pockets to said detector, said detection providing a means for determining the amount of flux transmitted through said pockets, said amount providing information used in determining mass flow through said pockets.

3. An improved rotary feeder for transporting said particulate material of the type having a plurality of vanes extending radially from a rotatable shaft so as to form rotatable pockets within a housing, said improvement comprising:
    a radiation source disposed within said shaft; and
    a radiation detector disposed externally of said housing, said detector providing a means for determining the amount of radiation flux transmitted through said pockets, said amount providing information used in determining mass flow through said pockets.

* * * * *